United States Patent
Takahashi (10) Patent No.: US 12,194,702 B2
(45) Date of Patent: Jan. 14, 2025

(54) RUBBER TEMPERATURE MEASURING DEVICE AND RUBBER PRODUCT MANUFACTURING METHOD

(71) Applicant: The Yokohama Rubber Co., LTD., Tokyo (JP)

(72) Inventor: Yukihisa Takahashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 850 days.

(21) Appl. No.: 17/268,844

(22) PCT Filed: Jun. 14, 2019

(86) PCT No.: PCT/JP2019/023677
§ 371 (c)(1),
(2) Date: Feb. 16, 2021

(87) PCT Pub. No.: WO2020/039713
PCT Pub. Date: Feb. 27, 2020

(65) Prior Publication Data
US 2021/0229384 A1  Jul. 29, 2021

(30) Foreign Application Priority Data
Aug. 21, 2018 (JP) ................. 2018-154633

(51) Int. Cl.
*B29D 30/06* (2006.01)
(52) U.S. Cl.
CPC ..... *B29D 30/0662* (2013.01); *B29D 30/0605* (2013.01); *B29D 2030/0677* (2013.01)

(58) Field of Classification Search
CPC ............................................. B29D 2023/0677
See application file for complete search history.

(56) References Cited

U.S. PATENT DOCUMENTS 4,115,046 A * 9/1978 Smith ................. B29C 35/0288
425/162
5,055,245 A * 10/1991 Hisatomi ............ B29C 35/0288
264/315

(Continued)

FOREIGN PATENT DOCUMENTS

FR  2942162 A1 * 8/2010 ............... G01K 1/14
HU  E035499 T2 * 5/2018

(Continued)

*Primary Examiner* — Timothy Kennedy
(74) *Attorney, Agent, or Firm* — Thorpe North & Western (57) ABSTRACT

In a rubber temperature measuring device, a temperature sensor and a biasing member are disposed in an installation hole formed in a molding surface of a mold. The temperature sensor is biased by the biasing member and a temperature detecting unit at a tip end projects from the molding surface and is not in contact with the mold. The mold is closed and vulcanized in a state in which a green tire making contact with the temperature detecting unit presses the temperature sensor against biasing force of the biasing member and an opening portion of the installation hole is blocked by the temperature detecting unit. Temperature data detected by the temperature detecting unit is input to a control unit disposed outside the mold through a communication line extending in a communicating hole communicating with the installation hole.

11 Claims, 7 Drawing Sheets

(56) References Cited

U.S. PATENT DOCUMENTS

| | | | | |
|---|---|---|---|---|
| 5,261,806 A | * | 11/1993 | Pleasant | B29C 45/2673 |
| | | | | 425/192 R |
| 9,061,340 B2 | * | 6/2015 | Lee | B21D 37/16 |
| 2012/0234069 A1 | | 9/2012 | Katsuro et al. | |
| 2017/0095965 A1 | * | 4/2017 | Tosaki | B29C 33/10 |

FOREIGN PATENT DOCUMENTS

| | | | |
|---|---|---|---|
| JP | 2006-300649 A | | 11/2006 |
| JP | 2017-113996 A | | 6/2017 |
| KR | 200153947 Y1 | * | 8/1999 |
| KR | 20-0135696 | | 10/1999 |
| KR | 0135696 Y1 | * | 10/1999 |
| KR | 10-1612055 | | 4/2016 |
| WO | 2011/055416 A1 | | 5/2011 |

\* cited by examiner

RUBBER TEMPERATURE MEASURING DEVICE AND RUBBER PRODUCT MANUFACTURING METHOD

TECHNICAL FIELD

The present technology relates to a rubber temperature measuring device and a rubber product manufacturing method and particularly relates to a rubber temperature measuring device and a rubber product manufacturing method capable of accurately determining the temperature of rubber in a vulcanization step using a vulcanization mold.

BACKGROUND ART

A pneumatic tire is manufactured through a vulcanization step of heating and pressurizing a green tire in a vulcanization mold. In order to manufacture tires having constant quality, it is important to appropriately set the heating temperature for green tires in the vulcanization step. In the related art, various methods for determining the heating temperature have been proposed (for example, see Japan Unexamined Patent Publication No. 2017-113996). Japan Unexamined Patent Publication No. 2017-113996 proposes a structure in which a sheath thermocouple is disposed on a molding surface of a vulcanization mold in a state in which the outer circumference of the sheath thermocouple is surrounded by the heat shielding layer. In this structure, the sheath thermocouple that detects the temperature of the green tire is less susceptible to the heat of the mold due to a heat shielding layer. As a result, the temperature of the green tire that is heated is easily detected with high accuracy.

However, in order to accurately detect the temperature with the thermocouple, it is necessary to press a measurement object (green tire) against the thermocouple to some extent. However, the thermocouple may not be sufficiently pressed by the green tire, for example, immediately after the mold is closed. In addition, in order to sufficiently block the effect of the heat of the mold on the thermocouple, the heat shielding layer needs to have a corresponding layer thickness, and it is necessary to form a large hole to some extent in the molding surface of the mold. Since a hole of such a size cannot be formed in the molding surface on which a complex pattern or the like is formed, it may not be possible to dispose a thermocouple at a desired position on the molding surface of the mold.

The above-described problems also occur in a rubber product vulcanized using a vulcanization mold without being limited to a case of manufacturing tires. Therefore, there is room for improvement in accurately detecting the temperature of rubber in a vulcanization step using a vulcanization mold.

SUMMARY

The present technology provides a rubber temperature measuring device and a rubber product manufacturing method capable of accurately determining the temperature of rubber in a vulcanization step using a vulcanization mold.

A rubber temperature measuring device according to an embodiment of the present technology is a rubber temperature measuring device including: a temperature sensor disposed in an installation hole formed in a molding surface of a mold for vulcanization, the installation hole having an opening portion; and a control unit which is disposed outside the mold for vulcanization and to which temperature data detected by the temperature sensor is input, a biasing member being disposed in the installation hole, a communication line extending into a communicating hole communicating with the installation hole to communicably connecting the temperature sensor and the control unit, the temperature sensor being biased by the biasing member in a direction of projecting from the molding surface, whereby a temperature detecting unit at a tip end of the temperature sensor projects from the molding surface and is maintained at a standby position in which the temperature detecting unit is not in contact with the mold, and a molded article being installed in the mold and the mold being closed, whereby the temperature detecting unit is pressed by the molded article against biasing force of the biasing member and the opening portion is blocked by the temperature detecting unit.

A rubber product manufacturing method according to an embodiment of the present technology is a rubber product manufacturing method in which a molded article is disposed in a mold for vulcanization to vulcanize unvulcanized rubber that forms the molded article to manufacture a rubber product, the method including: biasing, by a biasing member disposed in an installation hole having an opening portion, the installation hole being formed in a molding surface of the mold, a temperature sensor disposed in the installation hole in a direction of projecting from the molding surface of the mold, whereby a temperature detecting unit at a tip end of the temperature sensor projects from the molding surface and is not in contact with the mold; installing the molded article in the mold and closing the mold and performing vulcanization in a state in which the temperature sensor is pressed by the molded article making contact with the temperature detecting unit against biasing force of the biasing member and the opening portion is blocked by the temperature detecting unit; and transmitting temperature data detected by the temperature detecting unit to outside the mold through a communication line extending into a communicating hole communicating with the installation hole, the communication line being connected to the temperature sensor.

According to an embodiment of the present technology, the temperature sensor disposed in the installation hole is biased in a direction of projecting from the molding surface of the mold, by the biasing member disposed in the installation hole formed in the molding surface of the mold, so that the temperature detecting unit at the tip end of the temperature sensor projects from the molding surface and is not in contact with the mold. Therefore, before the mold is closed, the temperature of the mold is prevented from being directly transmitted to the temperature detecting unit. After the mold is closed, the molded article is brought into contact with the temperature detecting unit to press the temperature sensor against the biasing force of the biasing member. Due to this, it is advantageous in accurately detecting the temperature of the molded article being in contact using the temperature sensor, and the temperature data detected by the temperature sensor can be obtained through the communication line. Furthermore, since the opening portion of the installation hole formed in the molding surface is blocked by the temperature detecting unit during vulcanization of the molded article, unvulcanized rubber that forms the molded article will not flow into the installation hole, and the temperature sensor can be used repeatedly.

DETAILED DESCRIPTION

A rubber temperature measuring device and a rubber product manufacturing method according to an embodiment of the present technology will be described below based on embodiments illustrated in the drawings.

Figure 1:
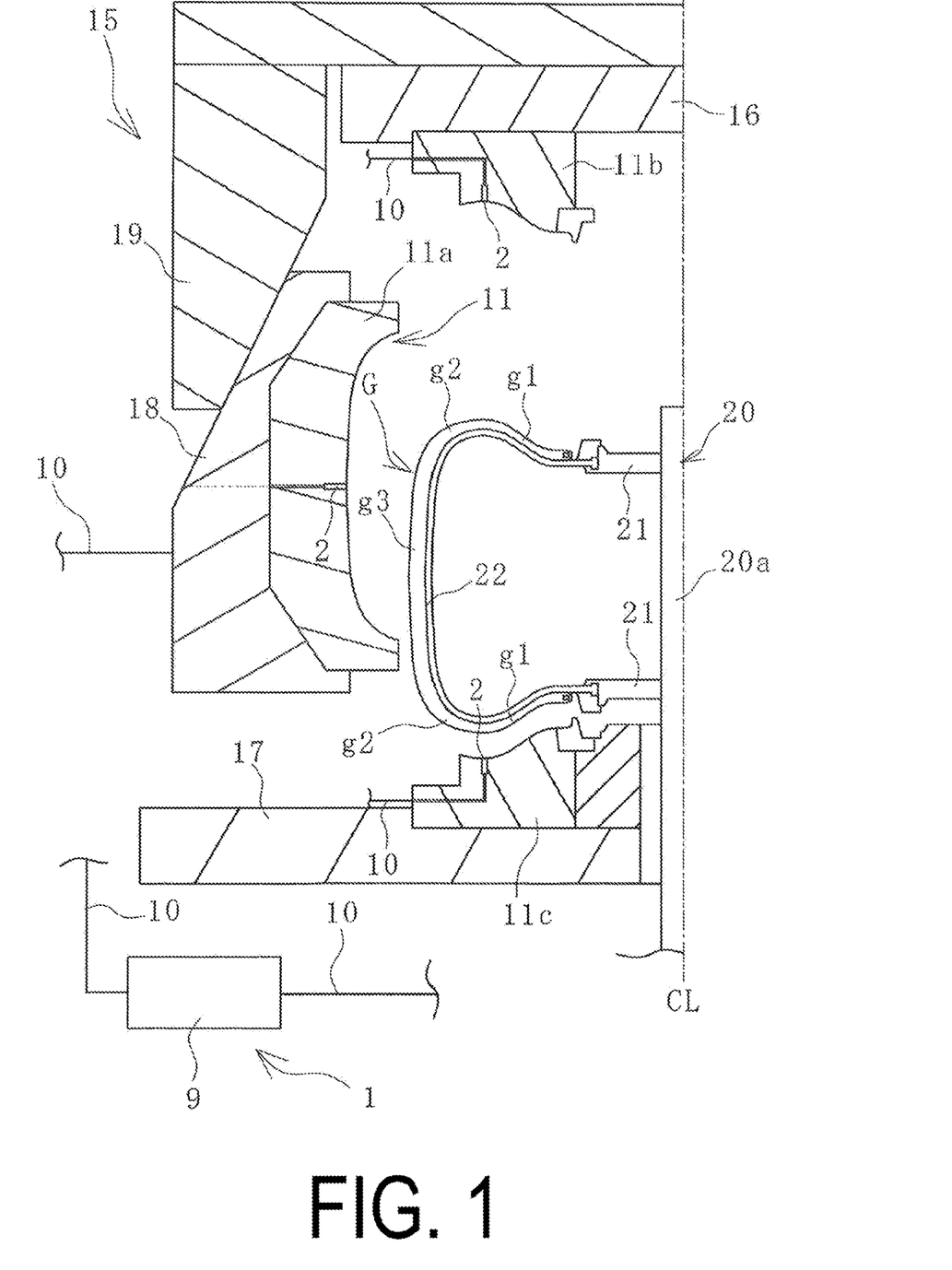
FIG. 1 is an explanatory diagram illustrating an embodiment of a rubber temperature measuring device installed in a vulcanization mold of a tire in a cross-sectional view of the left half of the mold.
Figure 2:
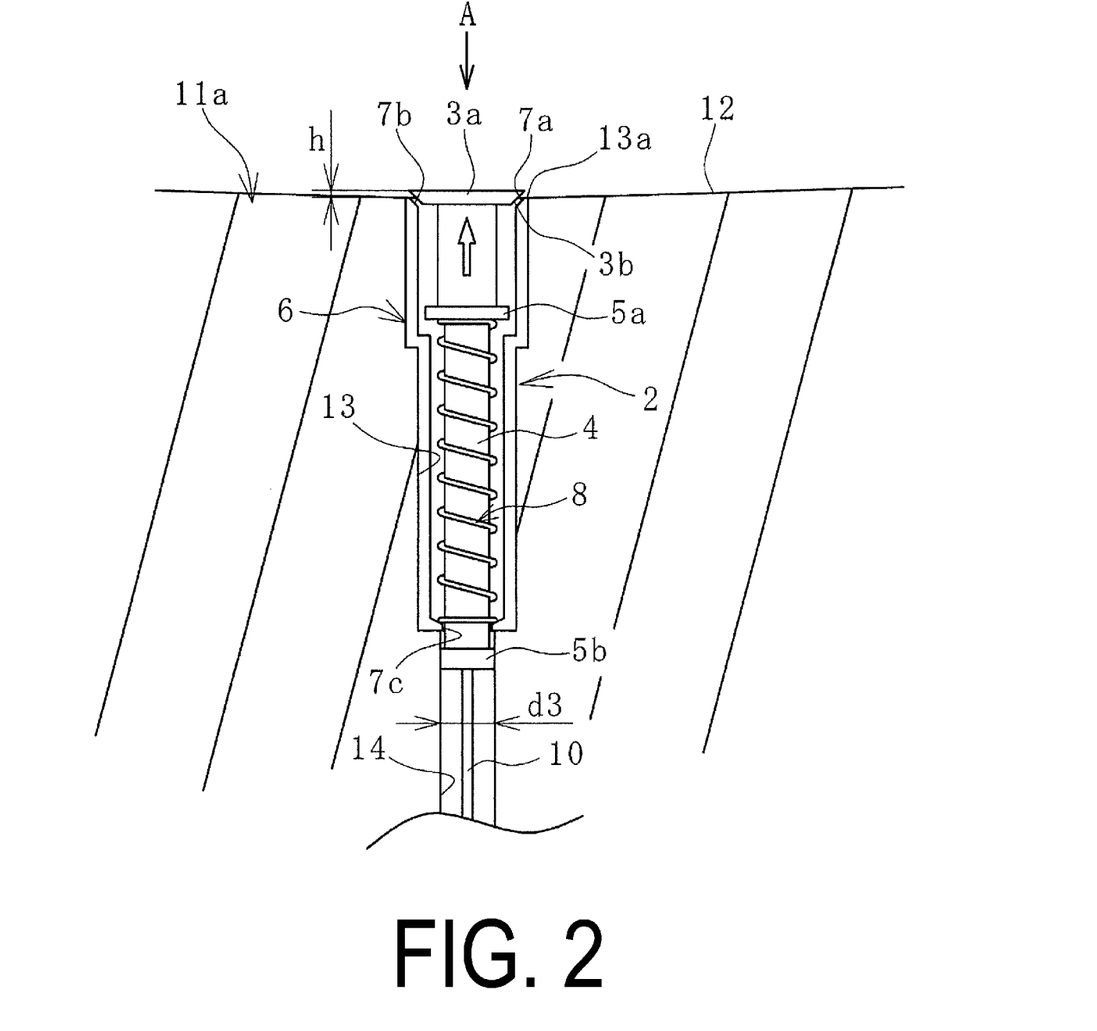
FIG. 2 is an enlarged explanatory diagram illustrating a portion of the temperature measuring device of FIG. 1.
Figure 3:
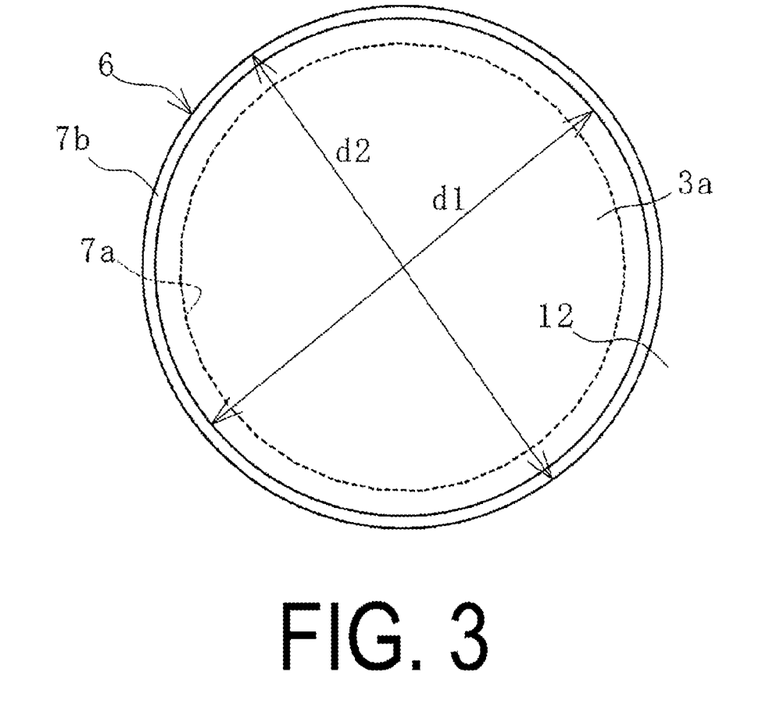
FIG. 3 is a view along an arrow A in FIG. 2.

The embodiment of a rubber temperature measuring device 1 according to an embodiment of the present technology illustrated in FIGS. 1 to 3 is mounted on a vulcanization mold 11 of a tire attached to a vulcanization device 15 of the tire. The mold 11 includes a plurality of sector molds 11a, an annular upper side mold 11b, and an annular lower side mold 11c. The sector mold 11a vulcanizes a shoulder portion g2 and a tread portion g3 of a green tire G, and the upper side mold 11b and the lower side mold 11c vulcanize a side portion g1. The mold 11 is formed, for example, from aluminum or an aluminum alloy. FIG. 1 illustrates the mold 11 in an open state (the state before being closed).

An installation hole 13 having an opening portion 13a is formed at a predetermined position of a molding surface 12 of the mold 11. The installation hole 13 is formed in the molding surface 12 that forms a portion of at least one of the tire side portion g1, the tire shoulder portion g2, and the tire tread portion g3. Further, a communicating hole 14 that communicates with the installation hole 13 and extends to the outer surface of the mold 11 is formed in the mold 11.

The vulcanization device 15 includes an upper plate 16, a lower plate 17, a segment 18, a container ring 19, and a center mechanism 20. The upper surface of the upper side mold 11b is attached to the lower surface of the upper plate 16 so as to face each other, and the lower surface of the lower side mold 11c is attached to the upper surface of the lower plate 17 so as to face each other. The lower plate 17 is fixed to the ground base in an immovable state.

A center post 20a that forms the center mechanism 20 is disposed in an annular center CL of the upper side mold 11b and the lower side mold 11c. Disc-shaped clamp portions 21 are attached to the center post 20a at intervals in the vertical direction. The upper and lower end portions of a cylindrical vulcanization bladder 22 are gripped by the respective clamp portions 21.

The segments 18 are arranged in an annular shape about the center mechanism 20 (the center CL). The outer circumferential surface of the sector mold 11a is attached to the inner circumference side of each of the segments 18 so as to face each other. The outer circumferential surface of each segment 18 has an inclined surface inclined upward from the outer circumference side toward the inner circumference side.

The annular container ring 19 is an annular body about the center mechanism 20 (the center CL) and moves up and down on the outer circumference side of the segments 18 arranged in an annular shape. When the container ring 19 moves up and down, the inner circumferential inclined surface of the container ring 19 and the outer circumferential inclined surface of each of the segments 18 make sliding contact with each other. When the outer circumferential surface of each segment 18 is pressed by the inner circumferential surface of the container ring 19 moving downward in a state in which each of the segments 18 is mounted on the lower plate 17, each sector mold 11a moves closer to the annular center CL together with the segment 18.

The temperature measuring device 1 includes: a temperature sensor 2 and a biasing member 8 disposed in the installation hole 13; a control unit 9 disposed outside the mold 11; and a communication line 10 that extends into the communicating hole 14 and communicatively connects the temperature sensor 2 and the control unit 9. In this embodiment, a tubular casing 6 that is fitted into the installation hole 13 is also provided, and the temperature sensor 2 and the biasing member 8 are inserted into the casing 6. Note that the casing 6 may be optionally provided.

The temperature sensor 2 has a temperature detecting unit 3a that is expanded in diameter at the tip end of a shaft part 4 and has flange portions 5a and 5b at a longitudinal intermediate portion and a rear end portion of the shaft part 4. For example, an electrode or the like of a thermocouple is provided in the temperature detecting unit 3a. The communication line 10 connected to the rear end portion of the shaft part 4 is electrically connected to the temperature detecting unit 3a. The side surface of the temperature detecting unit 3a is a tapered surface 3b that expands in diameter toward the tip end.

The temperature detecting unit 3a, the shaft part 4, and the flange portions 5a, 5b can be formed from metal such as common carbon steel or non-metal such as ceramics. For example, these members (at least the temperature detecting unit 3a) can be made of a material having a thermal conductivity of 50% or less than the material of the molding surface 12 so that the heat of the mold 11 is less likely to be transferred thereto.

The shape in a plan view of the temperature detecting unit 3a may be circular, but the shape is not limited thereto, and the shape may be an elliptical shape or a polygonal shape. An outer diameter equivalent dimension d1 (the long diameter in an elliptical shape and the diameter of a circumscribed circle in a polygonal shape) in a plan view of the temperature detecting unit 3a is, for example, approximately 1.5 mm or greater and 3 mm or less.

The biasing member 8 is disposed between the flange portions 5a and 5b. In this embodiment, a coil spring is used as the biasing member 8, and the shaft part 4 is in a state of being inserted into the coil spring. A heat shielding layer having a lower thermal conductivity than the material of the biasing member 8 can be coated on the surface of the biasing member 8. Other known types of spring, bushing formed of an elastic material such as vulcanized rubber, or the like can be used as the biasing member 8.

The casing 6 has a tip end opening portion 7a and a rear end opening portion 7c, the temperature detecting unit 3a is disposed close to the tip end opening portion 7a, and the flange portion 5b is disposed close to the back end opening portion 7c. The tip end opening portion 7a has a tapered surface 7b that expands in diameter toward the molding surface 12. Specifically, the shaft part 4 is inserted through the rear end opening portion 7c, and the flange portion 5b is disposed outside the casing 6. The flange portion 5b is expanded in diameter more than the rear end opening portion 7c and functions as a stopper that prevents the temperature sensor 2 from coming out of the tip end opening portion 7a of the casing 6.

This stopper structure can be formed, for example, by passing the flange portion 5b through the rear end opening portion 7c before the casing 6 is fitted into the installation hole 13, and then contracting the rear end opening portion 7c in diameter. Alternatively, the stopper structure can be formed by a method such as forcibly passing the flange portion 5b through the rear end opening portion 7c so that the rear end opening portion 7c is temporarily expanded in diameter (elastically deformed) or the flange portion 5c is temporarily compressively deformed (elastically deformed).

The casing 6 can also be formed of metal such as common carbon steel or non-metal such as ceramics. For example, the casing 6 can be made of a material having a thermal conductivity of 50% or less than the material of the molding surface 12 so that the heat of the mold 11 is less likely to be transferred thereto.

The casing 6 may have a cylindrical shape, but the shape is not limited thereto, and the shape may be an elliptical cylindrical shape or a polygonal cylindrical shape. An outer diameter equivalent dimension d2 (the long diameter in an elliptical cylindrical shape and the outer diameter of a circumscribed circle in a polygonal cylindrical shape) in a plan view of the casing 6 is larger than the outer diameter equivalent dimension d1 of the temperature detecting unit 3a and, for example, is approximately 2 mm or greater and 4 mm or less.

The biasing member 8 comes into contact with the flange portion 5a and the bottom surface of the casing 6 and constantly biases the temperature sensor 2 in a direction of projecting from the molding surface 12. Due to the biasing force of the biasing member 8, the temperature detecting unit 3a projects from the molding surface 12 and remains in a standby position in which the temperature detecting unit 3a is not in contact with the mold 11. A projection dimension h of the tip end surface of the temperature detecting unit 3a projecting from the molding surface 12 is, for example, 0.1 mm or greater and 1.0 mm or less.

A computer or the like having a calculating function and a storage function is used in the control unit 9 to which the temperature data detected by the temperature sensor 2 is input. An inner diameter d3 of the communicating hole 14 is, for example, approximately, 0.5 mm or greater and 3 mm or less.

Next, an example of a method for manufacturing a pneumatic tire by vulcanizing the green tire G by the vulcanization device 15 while measuring the temperature of the green tire G, which is a molded article, using the temperature measuring device 1 will be described.

The main member constituting the green tire G is unvulcanized rubber and a reinforcing wire of metal or a resin. When the green tire G is vulcanized, the green tire G in a state of lying sideways is inserted through the center mechanism 20 in a state in which the mold 11 is open as illustrated in FIG. 1. The green tire G is then held from the inner side by the bladder 22 inflated by the shaping pressure. The green tire G is placed on the lower side mold 11c in a state of lying sideways.

Before the mold 11 is closed, as illustrated in FIG. 2, the temperature detecting unit 3a protrudes from the molding surface 12 and is maintained in a standby position in which the temperature detecting unit 3a is not in contact with the mold 11. Thus, the temperature of the mold 11 is prevented from being directly transferred to the temperature detecting unit 3a before the mold 11 is closed.

Subsequently, the container ring 19, the upper plate 16, and the upper side mold 11b are moved downward, and each of the segments 18 is placed on the lower plate 17. The outer circumferential inclined surface of each segment 18 is pressed by the inner circumferential inclined surface of the container ring 19 moving downward, and each sector mold 11a is moved toward the annular center CL together with the respective segments 18.

Figure 4:
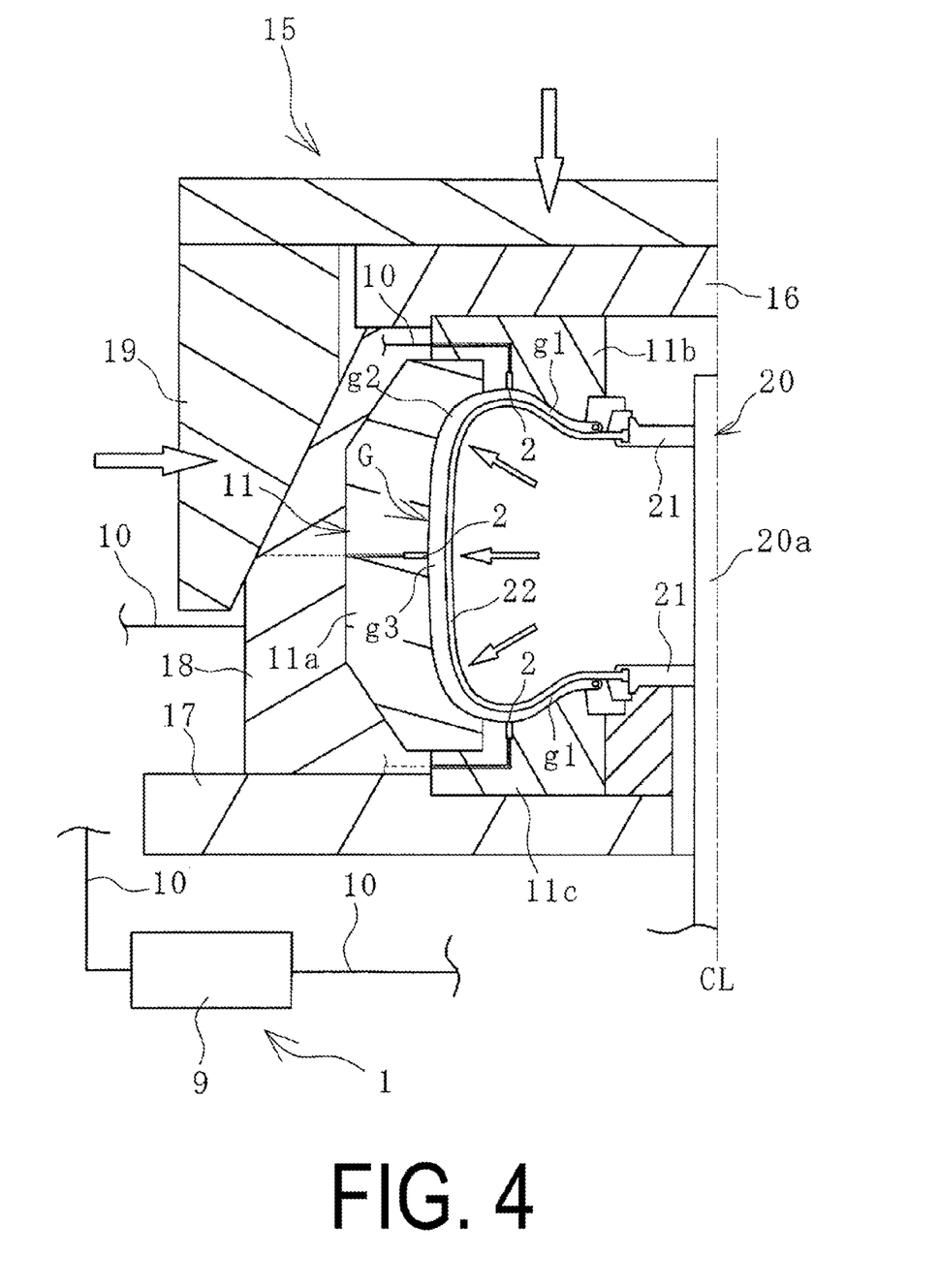
FIG. 4 is an explanatory diagram illustrating a state in which the mold of FIG. 1 is closed.

As a result, as illustrated in FIG. 4, the sector molds 11a are assembled in an annular shape between the upper plate 16 and the lower plate 17. Then, the sector molds 11a are each vertically sandwiched between the upper side mold 11b and the lower side mold 11c to close the mold 11.

With the mold 11 closed, a heating medium such as steam and a pressurizing medium such as nitrogen gas are sequentially injected into the bladder 22 to heat and further inflate the bladder 22. As a result, the inner side of the green tire G is mainly heated by the bladder 22, and the outer side of the green tire G is mainly heated by the mold 11. In this manner, the green tire G is heated and pressurized for a predetermined time in the closed mold 11 whereby a vulcanized tire is manufactured.

Figure 5:
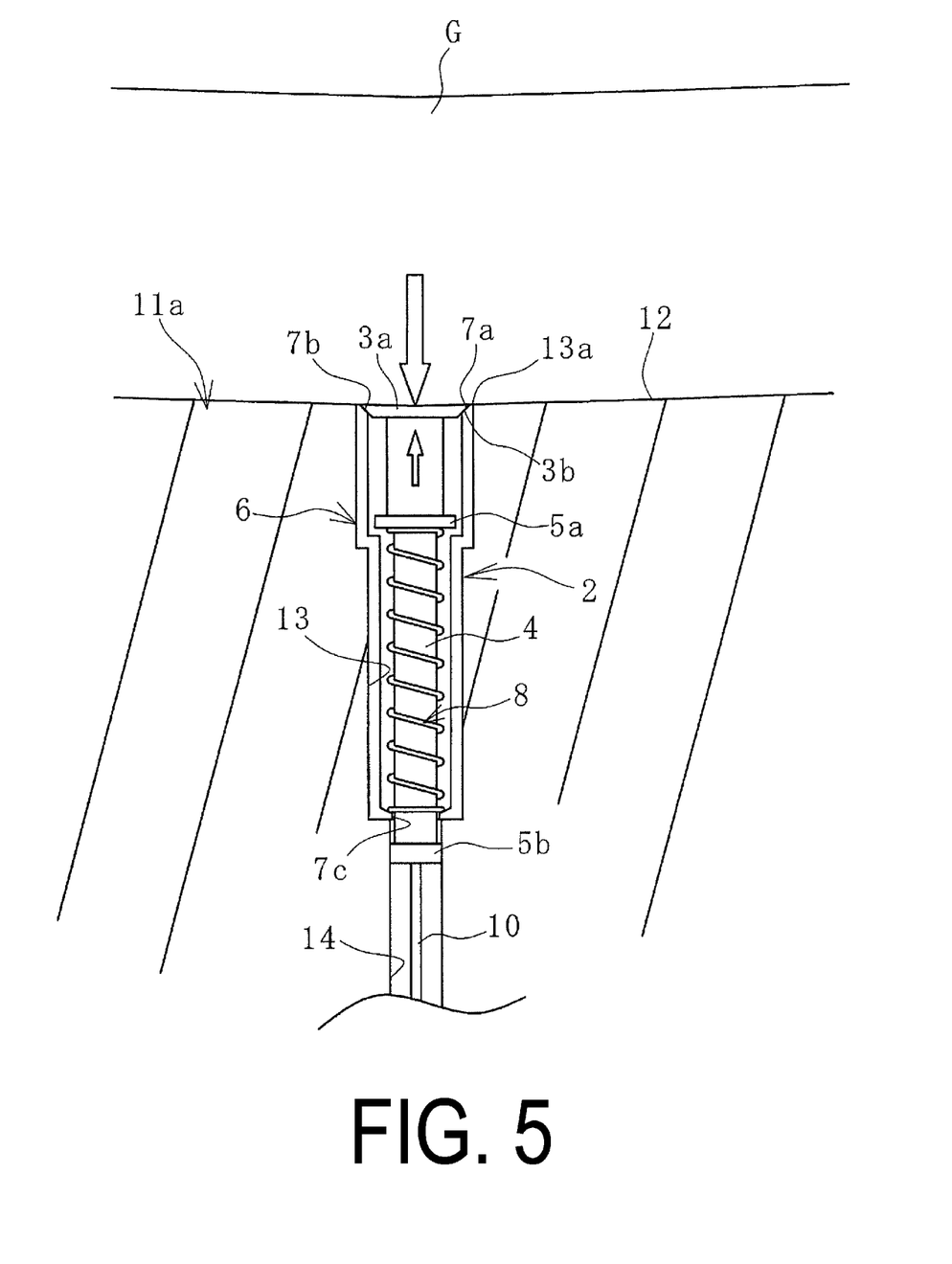
FIG. 5 is an enlarged explanatory diagram illustrating a portion of the temperature measuring device of FIG. 4.

Since the green tire G is installed in the mold 11 and the mold 11 is closed, as illustrated in FIG. 5, the green tire G makes contact with the temperature detecting unit 3a and presses the temperature sensor 2 toward the deeper side of the installation hole 13 against the biasing force of the biasing member 8. As a result, the opening portion 13a is blocked by the temperature detecting unit 3a.

Specifically, in this embodiment, the tapered surface 7b of the tip end opening portion 7a of the casing 6 comes into contact with the tapered surface 3b of the temperature detecting unit 3a, whereby the temperature detecting unit 3a is positioned at a predetermined position in the opening portion 13a, and the opening portion 13a is blocked by the temperature detecting unit 3a. In addition, the tip end surface of the temperature detecting unit 3a is at an identical level to the molding surface 12. Furthermore, since the temperature detecting unit 3a makes firm contact with the green tire G (unvulcanized rubber) to be pressed, it is advantageous in accurately detecting the temperature of the green tire G (unvulcanized rubber) being in contact using the temperature sensor 2. Since the temperature data detected by the temperature sensor 2 is input to the control unit 9 through the communication line 10, the temperature of the unvulcanized rubber during vulcanization can be detected more accurately.

Since the opening portion 13a is blocked by the temperature detecting unit 3a during vulcanization of the green tire G, the unvulcanized rubber constituting the green tire G can be prevented from flowing into the installation hole 13. Therefore, the temperature sensor 2 can be used repeatedly, and no unnecessary spew is formed on the surface of the manufactured tire.

In this embodiment, the biasing member 8 and the temperature sensor 2 to which the communication line 10 is connected can be unitized in advance by inserting and incorporating the same into the casing 6. Therefore, when the unitized casing 6 is fitted into the installation hole 13, the attachment of the temperature sensor 2 and the like to the mold 11 is made easy. Furthermore, by strongly pulling the temperature detecting unit 3a of the temperature sensor 2 disposed in the installation hole 13 toward the molding surface 12, the temperature sensor 2 and the communication line 10 can be pulled out from the casing 6. Thus, the replacement of the temperature sensor 2 and the like is made easy and maintainability is improved.

Since the temperature detecting unit 3a is not in contact with the mold 11 before the mold 11 is closed, the temperature detecting unit 3a does not need to be surrounded by the heat shielding layer with a corresponding layer thickness in order to block the heat of the mold 11 as in the related art. Therefore, the outer diameter equivalent dimension d2 of the casing 6 can be minimized to 4 mm or less or 3 mm or less. In other words, the area of the tip end surface of the temperature detecting unit 3a can be made sufficiently small. Therefore, even if a complex pattern (such as recesses and protrusions that form a pattern in the tire) is formed on the molding surface 12, it is advantageous in disposing the temperature detecting unit 3a (the temperature sensor 2) at a desired position on the molding surface 12.

Figure 6A:
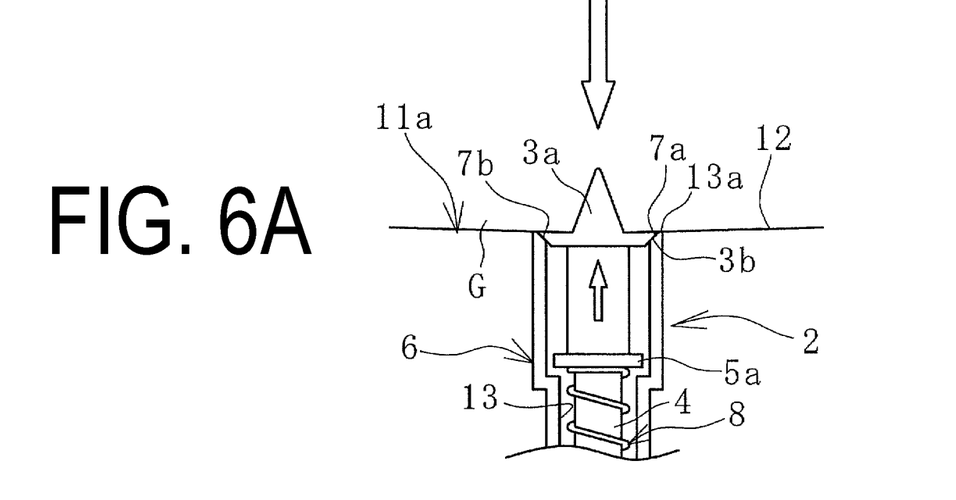
FIGS. 6A-6B are explanatory diagrams illustrating modified examples of a temperature detecting unit.
Figure 6B:
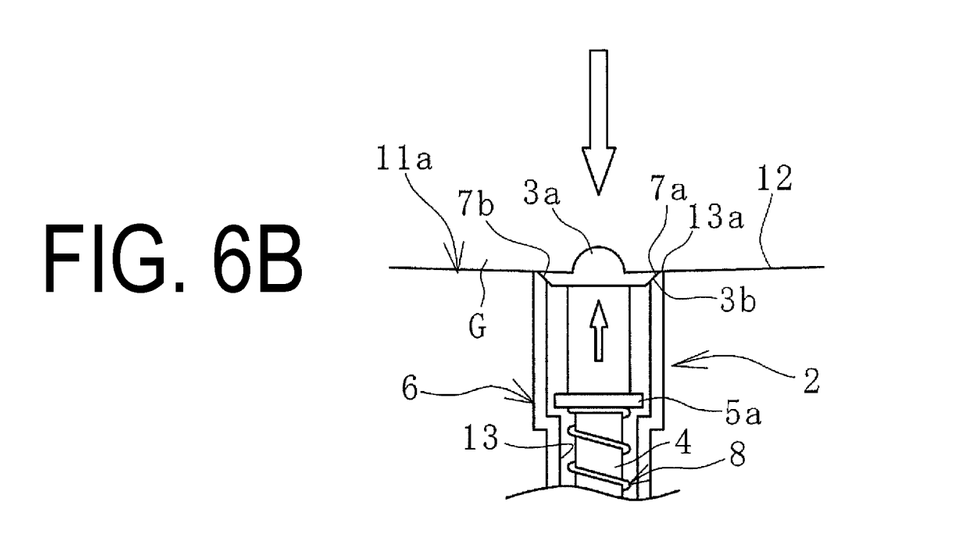

The shape of the tip end surface of the temperature detecting unit 3a is not limited to a flat surface, and as illustrated in FIGS. 6A-6B, the tip end surface can be appropriately formed in a desired shape. In FIGS. 6A and 6B, the tip end surface of the temperature detecting unit 3a has a conical shape and a hemispherical shape, respectively.

When the projection dimension h of the temperature detecting unit 3a from the molding surface 12 is increased in a state in which the opening portion 13a is blocked by the temperature detecting unit 3a, the temperature at a position deeper from the surface of the green tire G (unvulcanized rubber) can be detected. However, when the projection dimension h is increased, since a hole equivalent to the projection dimension h is formed in the manufactured tire, the projection dimension h is set in a range that does not affect the performance of the tire or the like.

Figure 7:
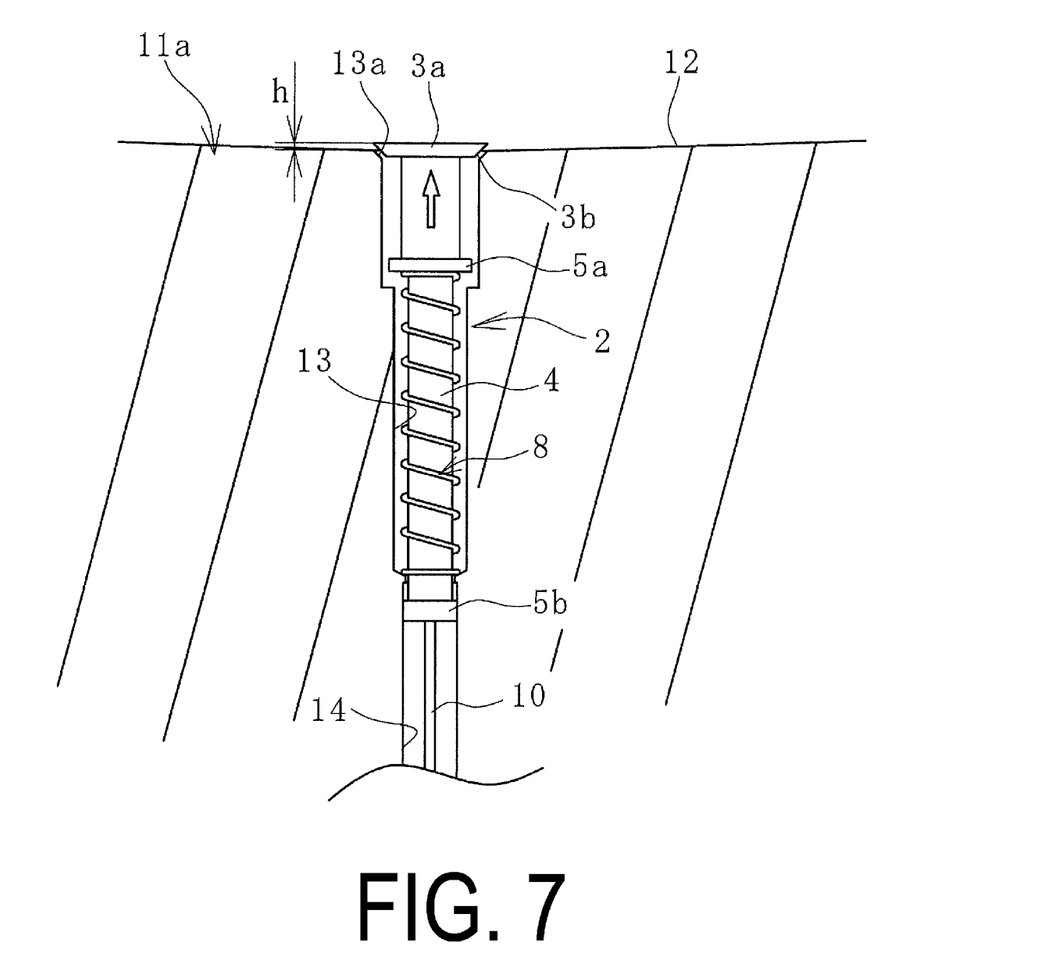
FIG. 7 is an enlarged explanatory diagram illustrating a portion of a temperature measuring device according to another embodiment.

As illustrated in FIG. 7, the casing 6 of the temperature measuring device 1 may be omitted from the above-described embodiment. In this configuration, the flange portion 5b is inserted into the communicating hole 14, for example. The biasing member 8 comes into contact with the flange portion 5a and the bottom surface of the installation hole 13 and constantly biases the temperature sensor 2 in a direction of projecting from the molding surface 12. Other specifications may be similar to the above-described embodiment.

In the description described above, a case in which the green tire G is vulcanized to manufacture a tire has been described, but an embodiment of the present technology is not limited thereto. That is, the temperature measuring device 1 and the rubber product manufacturing method described above can be applied to a case where a molded article with unvulcanized rubber as a constituent member is disposed in a vulcanization mold and is vulcanized to manufacture a rubber product.

The invention claimed is:

1. A rubber temperature measuring device, comprising:
a temperature sensor disposed in an installation hole formed in a molding surface of a mold for vulcanization, the installation hole having an opening portion; and
a control unit which is disposed outside the mold for vulcanization and to which temperature data detected by the temperature sensor is input,
a biasing member being disposed in the installation hole,
a communication line extending into a communicating hole communicating with the installation hole to communicably connect the temperature sensor and the control unit,
the temperature sensor being biased by the biasing member in a direction of projecting from the molding surface, whereby a temperature detecting unit at a tip end of the temperature sensor projects from the molding surface and is maintained at a standby position in which the temperature detecting unit is not in contact with the mold, the tip end of the temperature sensor having a greatest width of any portion of the rubber temperature measuring device disposed in the installation hole, and
a molded article being installed in the mold and the mold being closed, whereby the temperature detecting unit is pressed by the molded article against biasing force of the biasing member and the opening portion is blocked by the temperature detecting unit.

2. The rubber temperature measuring device according to claim 1, further comprising a casing having a tubular shape that is fitted into the installation hole, wherein the temperature sensor and the biasing member are inserted into the casing.

3. The rubber temperature measuring device according to claim 2, wherein
a tip end opening portion of the casing has a tapered surface that expands in diameter toward the molding surface,
the temperature detecting unit has a tapered surface corresponding to the tapered surface and facing the tip end opening portion, and
the tapered surface of the tip end opening portion and the tapered surface of the temperature detecting unit come into contact with each other, whereby the opening portion of the molding surface is blocked by the temperature detecting unit, and a tip end surface of the temperature detecting unit is at an identical level to the molding surface.

4. The rubber temperature measuring device according to claim 2, wherein an outer diameter equivalent dimension of the casing is 4 mm or less.

5. The rubber temperature measuring device according to claim 1, wherein a thermal conductivity of the temperature detecting unit is 50% or less of a thermal conductivity of the molding surface.

6. The rubber temperature measuring device according to claim 1, wherein the mold for vulcanization is a mold for tire vulcanization.

7. A rubber product manufacturing method in which a molded article is disposed in a mold for vulcanization to vulcanize unvulcanized rubber that forms the molded article to manufacture a rubber product, the method comprising:
biasing, by a biasing member disposed in an installation hole having an opening portion, the installation hole being formed in a molding surface of the mold, a temperature sensor disposed in the installation hole in a direction of projecting from the molding surface of the mold, whereby a temperature detecting unit at a tip end of the temperature sensor projects from the molding surface and is not in contact with the mold, the tip end of the temperature sensor having a greatest width of any portion of the rubber temperature measuring device disposed in the installation hole;
installing the molded article in the mold and closing the mold and performing vulcanization in a state in which the temperature sensor is pressed by the molded article making contact with the temperature detecting unit against biasing force of the biasing member and the opening portion is blocked by the temperature detecting unit; and
transmitting temperature data detected by the temperature detecting unit to outside the mold through a communication line extending into a communicating hole communicating with the installation hole, the communication line being connected to the temperature sensor.

8. The rubber product manufacturing method according to claim 7, wherein the molded article is a green tire, and the installation hole is formed in a molding surface that forms a portion of at least one of a tire side portion, a tire tread portion, and a tire shoulder portion.

9. The rubber temperature measuring device according to claim 3, wherein an outer diameter equivalent dimension of the casing is 4 mm or less.

10. The rubber temperature measuring device according to claim 9, wherein a thermal conductivity of the temperature detecting unit is 50% or less of a thermal conductivity of the molding surface.

11. The rubber temperature measuring device according to claim 10, wherein the mold for vulcanization is a mold for tire vulcanization.

\* \* \* \* \*